US006730652B1

(12) United States Patent
Painter et al.

(10) Patent No.: US 6,730,652 B1
(45) Date of Patent: May 4, 2004

(54) PROCESS FOR MAKING NON-STAINING COLORED PARTICLES FOR IMPROVING AESTHETICS OF A LIQUID AUTOMATIC DISHWASHING DETERGENT PRODUCT, THE PARTICLES, AND A COMPOSITION

(75) Inventors: Jeffrey Donald Painter, Loveland, OH (US); Joseph Herbert Thien, Fairfield, OH (US); Peter Robert Foley, Cincinnati, OH (US); Brian Xiaoqing Song, West Chester, OH (US); Mary Ruth Leyendecker, Cincinnati, OH (US); Eugene Steven Sadlowski, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/937,356

(22) PCT Filed: Apr. 18, 2000

(86) PCT No.: PCT/US00/10386
§ 371 (c)(1), (2), (4) Date: Sep. 24, 2001

(87) PCT Pub. No.: WO00/63341
PCT Pub. Date: Oct. 26, 2000

Related U.S. Application Data

(60) Provisional application No. 60/130,044, filed on Apr. 19, 1999.

(51) Int. Cl.⁷ ............................ C11D 3/14; C11D 11/02
(52) U.S. Cl. .................. 510/443; 510/444; 510/446; 510/470; 510/475

(58) Field of Search ................. 510/446, 452, 510/470, 475, 443, 444

(56) References Cited

U.S. PATENT DOCUMENTS

| 4,196,104 A | * | 4/1980 | Oguhaga ............ 252/542 |
| 5,516,447 A | * | 5/1996 | Bauer et al. ............ 252/89 |
| 5,719,115 A | * | 2/1998 | Paatz et al. ............ 510/392 |
| 5,879,920 A | * | 3/1999 | Dale et al. ............ 435/187 |

FOREIGN PATENT DOCUMENTS

| EP | 286773 A2 | * | 10/1988 |
| EP | 0 286 773 A2 | | 10/1988 |
| GB | 990252 | * | 4/1965 |
| WO | WO 98/16615 | | 4/1998 |
| WO | WO 98/16615 A1 | * | 4/1998 |

* cited by examiner

Primary Examiner—John Hardee
(74) Attorney, Agent, or Firm—Kevin L. Waugh

(57) ABSTRACT

A process for forming a non-staining colored composite particle suitable for incorporation in a bleach-containing or a non-bleach-containing liquid detergent composition is disclosed. The process includes the steps of forming a colored liquid dispersion of pigment particles in a first liquid medium wherein the size of the pigment particles in the colored liquid dispersion is no greater than about 5 $\mu$m. The process includes the step of mixing the colored liquid dispersion with a polymeric material and a second liquid medium to form a sprayable colored polymeric material. The process also includes the step of spraying the colored polymeric material on a composite particle and forming a colored polymeric coating on the composite particle. A non-staining colored particle and a liquid ADW detergent composition are also disclosed.

14 Claims, No Drawings

PROCESS FOR MAKING NON-STAINING COLORED PARTICLES FOR IMPROVING AESTHETICS OF A LIQUID AUTOMATIC DISHWASHING DETERGENT PRODUCT, THE PARTICLES, AND A COMPOSITION

This application claims benefit of application No. 60/130,044 filed Apr. 19, 1999.

TECHNICAL FIELD

The present invention generally relates to liquid automatic dishwashing detergent compositions. More particularly, the invention relates to a process for making colored particles that can be incorporated into a bleach-containing or non-bleach-containing liquid automatic dishwashing detergent composition for improving the aesthetics of the liquid composition wherein the colored particles do not stain the plastic surfaces of dishware or an automatic dishwasher.

BACKGROUND OF THE INVENTION

Consumers of liquid ADW products have a preference for such products having a certain color or appearance. The addition of solid particles suspended into a liquid ADW composition can improve the aesthetics of the product by simply improving the physical appearance of the product. This is particularly true if the particles are colored and their color is matched effectively to the base color of the liquid ADW composition.

Previously used particles in liquid ADW products have had a major disadvantage of contributing negatively to unwanted filming, particularly on glass, stainless steel and plastic surfaces. This is because the previously used particles have been coated with water-insoluble coatings, such as waxes, which melt and are released into the wash solution due to the high temperature encountered during the automatic dishwashing process.

Further, in the arena of bleach containing liquid ADWs, the particles cannot be colored by simply using a dye, because during storage of the liquid ADW product, the dye gets bleached. Thus, the formulators have to use bleach-safe pigments to impart an aesthetically pleasing color. Before this invention, the incorporation of pigments posed a major problem: the color of the pigment is found to detrimentally stain plastic surfaces, such as plastic dishware and the internal plastic surfaces of a dishwasher.

It has been desirable to have a process by which colored pigment based particles can be made for incorporation in bleach-containing or non-bleach-containing liquid ADW product, such that the particles are non-staining. It has also been desirable that the solid particles do not dissolve in the liquid ADW product, but dissolve rapidly in the wash solution during automatic dishwashing. It has been desirable to have a liquid ADW product having solid particles that do not cause a significant amount of unwanted filming on glass, stainless steel and plastic.

The inventors of the present invention have discovered a process of coating the particles with a pigment in a manner such that the particles are non-staining. This invention is not limited to just bleach-containing liquid ADWs and is also applicable to non-bleach-containing liquid ADWs that are incorporated with prills or particles colored with pigments. The present invention is thus directed to overcome one or more of the problems as set forth before.

SUMMARY OF THE INVENTION

The invention meets the needs above by providing a process for forming a non-staining colored composite particle suitable for incorporation in a bleach-containing or non-bleach-containing liquid detergent composition, a non-staining colored composite particle and a liquid dishwashing detergent composition.

In one aspect of the present invention, the process includes the steps of forming a colored liquid dispersion of pigment particles in a first liquid medium. The size of the pigment particles in the colored liquid dispersion is no greater than about 5 $\mu$m. The process includes the step of mixing the colored liquid dispersion with a polymeric material and a second liquid medium to form a sprayable colored polymeric material. The polymeric material being selected from the group consisting of alkyl cellulose ethers and polyvinyl alcohol. The process also includes the step of spraying the colored polymeric material on a composite particle and forming a colored polymeric coating on the composite particle.

In another aspect of the present invention, a non-staining colored composite particle suitable for incorporation in a bleach-containing liquid detergent composition is disclosed. The particle is made by the process as set forth above.

In yet another aspect of the present invention, a liquid automatic dishwashing detergent product is disclosed. The product includes a liquid dishwashing detergent composition containing chlorine bleach, and non-staining colored composite particles. The particles are made by the process as set forth above.

DETAILED DESCRIPTION OF THE INVENTION

In the preferred embodiment of the present invention, the process includes the steps of forming a colored liquid dispersion of pigment particles in a first liquid medium.
Pigment Processing The size of the pigment particles in the colored liquid dispersion is desirably no greater than about 5 $\mu$m. preferably no greater than about 1 $\mu$m, more preferably no greater than about 0.1 $\mu$m, and most preferably no greater than about 0.01 $\mu$m. It has been surprisingly discovered that when the pigment particle size in the pigment-liquid dispersion is maintained within the above size limitations, the resultant pigment, when deposited on a particle as a part of the sprayable polymeric slurry, is essentially non-staining. i.e., its color does not transfer onto plastic surfaces. The selection of the pigment particle size is the key to the present invention. One skilled in the art can apply other means for achieving a pigment particle size in the size limitation as disclosed above.

In the preferred embodiment, the first liquid medium is preferably water. Optionally, a minor amount of a nonionic surfactant is added to the water to improve the dispersion of the pigment. Typically, this surfactant is added in an amount no greater than about 10% by weight.

In the preferred embodiment, the process includes the step of maintaining the amount of surfactants used in the bleach-containing liquid detergent composition at a preselected value such that when the bleach-containing liquid detergent composition is diluted in a wash solution, the amount of surfactant delivered in the wash solution is less than critical micelle concentration. The term "critical micelle concentration" is well known to those skilled in the art and need not be explained any further for purposes of brevity.
Polymeric Coating In the preferred embodiment, the colored polymeric coating is insoluble in the liquid automatic dishwashing detergent composition but soluble in automatic dishwashing wash solution. The coating is prepared from materials which are insoluble in the liquid automatic dishwashing detergent composition but soluble in automatic dishwashing wash solution. The coating is prepared from materials selected from the group consisting of alkyl cellulose ethers and polyvinyl alcohol. Alternatively, the coating is prepared from alginate. Desirably, the alkyl cellulose ethers are selected from one of methyl cellulose and hydroxypropyl methyl cellulose (HPMC). Preferably, the coating is prepared from methyl cellulose having a number average molecular weight desirably in a range of from about 5000 to about 100,000, more preferably from about 10,000 to about 20,000, and most preferably, about 14,000. The preferred methyl cellulose is one sold under the trade name Methocel A15LV, and manufactured by Dow Chemicals. Alternatively, the polymeric coating is polyvinyl alcohol (PVA) having a molecular weight, desirably in a range of from about 5000 to about 100,000, and preferably from about 13,000 to about 23,000. The preferred PVA is from about 87% to about 89% hydrolyzed, such as a commercially available product having a trade name Airvol 205. Further, the particles are insoluble in the liquid automatic dishwashing detergent composition and only soluble in the wash solution during automatic dishwashing.

Process for Spraying Colored Polymeric Coating on Particles

The process by which the colored polymeric coating is prepared and deposited upon the particle is critical in order for the particles to remain undissolved in the liquid automatic dishwashing detergent composition and only become soluble in the wash solution during automatic dishwashing. It is desirable that the particles dispersed in the liquid ADW compositions do not break up or dissolve in the composition. It is also desirable that this be achieved without depositing an unduly thick coating of a polymeric material on the particle. It has been surprisingly discovered that when the polymeric material, such as methyl cellulose is sufficiently hydrated before spraying on the particle or prill, the polymer coated particle or prill remains stable, unbroken and undissolved in the liquid ADW composition. This hydration is achieved by forming a sprayable aqueous solution of the polymer (alkyl cellulose ether and/or polyvinyl alcohol) having a polymer concentration desirably in a range of from about 1% to about 30% by weight, preferably in a range of about 3% to about 20%, more preferably in a range of about 3% to about 10%, and most preferably, about 5%. Further, the temperature of aqueous solution of the polymer is desirably maintained within a range of from about 30° C. to about 40° C. while spraying the polymer solution on the particle, and preferably in a range of from about 32° C. to about 38° C., and most preferably at a temperature of about 35° C. It has been surprisingly found that by using a combination of the above process steps, i.e., the polymer solution being in a range of from about 1% to about 30% by weight, and the spray temperature being in a range of from about 30° C. to about 40° C., that a very stable, unbroken, continuous coating is formed on the particle or prill which is undissolved in the liquid ADW composition but soluble in the wash solution, while at the same time, requiring only about 5% polymer by weight of the particle. In the preferred embodiment, the coating is desirably present in an amount in a range of from about 1% to about 25% by weight of the particle, preferably from about 4% to about 10% by weight of the particle, and most preferably, about 5% by weight of the particle. The reduced coating weight levels are desirable so that the least effective coating amount is used in order to accomplish the objective to having a protective coating without unnecessary polymer that might detrimentally contribute to unwanted residue deposition in the washing machine.

Color

In one embodiment, the particles are colored and the automatic dishwashing liquid detergent composition is clear or translucent, so as to make the liquid automatic dishwashing product aesthetically pleasing. In another embodiment, the particles and the liquid automatic dishwashing detergent composition are both colored and the color of the particles is matched to the base color of the liquid composition. In one embodiment, the particles have a dark green color whereas the liquid composition has a light green color. Other preferred color combinations for the polymeric coating on the particles and the liquid automatic dishwashing composition are: blue:blue, blue:white, green:green, green:white and green:yellow, respectively.

Desirably, the particles comprise from about 0.1% to about 5.0% by weight of the liquid composition, and preferably, from about 0.2% to about 1.0% by weight of the liquid composition.

In another embodiment of the present invention, a non-staining colored composite particle suitable for incorporation in a bleach-containing liquid detergent composition is disclosed. The particle is made by the process as set forth above.

Particles

The particles can be formed from various materials that do not cause any detrimental affect upon the performance of the liquid detergent. Preferably, the particles are in the form of prills. The prills typically have a core which is coated with a polymeric coating as described before. The core can be made from sucrose, as an example. The method of forming prills is well known to those skilled in the art and is disclosed in the literature, such as for example, in U.S. Pat. No. 4,965,012, which is incorporated herein by reference.

The particles can be of various sizes and shapes, such as spherical, oval, cylindrical or polygonal and desirably have a particle size in a range of from about 200 μm to about 5000 μm, preferably, from about 400 μm to about 2000 μm, and most preferably, from about 500 μm to about 850 μm.

In yet another embodiment of the present invention, a liquid automatic dishwashing detergent product is disclosed. The product includes a liquid dishwashing detergent composition containing chlorine bleach, and non-staining colored composite particles. The particles are made by the process as set forth above.

Liquid Automatic Dishwashing Composition Components

The liquid automatic dishwashing detergent product is highly viscous in a quiescent state and has a relatively high yield stress values. When subjected to shear stresses, however, such as being shaken in a container or squeezed through an orifice, the product quickly fluidizes and upon cessation of the applied shear stress, quickly reverts to a high viscosity state. The above liquid automatic dishwashing detergent product is preferably low foaming, readily soluble in the washing medium and most effective at pH values best conducive to improved cleaning performance, such as in a range of desirably from about pH 7.0 to about pH 13.0, and preferably from about pH 8.0 to about pH 12.0.

The physical stability of the liquid product may be improved and the thickness of the liquid product may be altered by the addition of a cross linking polyacrylate thickener to the liquid detergent product as a thixotropic thickener.

PH Adjusting Components

The pH adjusting components are desirably selected from sodium or potassium carbonate or sesquicarbonate, sodium or potassium silicate, citric acid, sodium or potassium bicarbonate, sodium or potassium borate, sodium or potassium hydroxide, and mixtures thereof. NaOH or KOH are the preferred ingredients for increasing the pH to within the above ranges. Other preferred pH adjusting ingredients are sodium carbonate, potassium carbonate, and mixtures thereof.

Low Foaming Surfactant

Chlorine bleach stable low foaming surfactants are preferred and such surfactants are present in a range of from about 0.1% to about 10% by weight of the liquid composition. Such surfactants are generally known to one skilled in the art and need not be elaborated here, for purposes of brevity. One example of such a surfactant is an anionic surfactant commercially available under the trade name Dowfax.

Other Ingredients

The liquid automatic dishwashing detergent composition optionally also contains from about 0.5% to about 20% of a dispersant polymer selected from the group consisting of polyacrylates and polyacrylate copolymers, and from about 0.1% to about 5% of a chlorine bleach stable foam suppressant. Such foam suppressants are well known to those skilled in the art.

To exemplify various embodiments of the present invention, Sample A of the liquid automatic dishwashing detergent product composition is formulated using the below named ingredients, as set forth in Example A.

EXAMPLE A

| Ingredient (weight % active) | A |
| --- | --- |
| Sodium Tripolyphosphate | 17.5 |
| Potassium Tripolyphosphate | — |
| Sodium Silicate | 6.0 |
| Potassium hydroxide | 3.6 |
| Sodium hydroxide | 2.0 |
| Polyacrylate polymer | 1.0 |
| Nitric Acid | 0.012 |
| Perfume | 0.03 |
| Nonionic surfactant | — |
| Sodium Benzoate | 0.75 |
| Sodium hypochlorite | 1.15 |
| Polyacrylate polymer thickener | 1.5 |
| Dye solution | — |
| Solid Prill | 0.5 |
| Water | Bal. |
| TOTAL | 100.0 |

In the above composition, the non-staining colored particles having a spherical shape, and a diameter of about 750 µm, are formed from a sucrose core coated with a polymeric coating formed from methyl cellulose (Methocel A15LV), and having a bluish-green color. The bluish-green color is imparted by adding a pigment into the methyl cellulose coating before spraying it on the particle according to the process of the present invention. The particles comprise about 0.1% to about 5% by weight of the liquid composition. The optimum methyl cellulose coating is about 5% by weight of the particle. The coating is sprayed on the sucrose core particle by spraying a 5% by weight aqueous solution of methyl cellulose with pigment. The aqueous solution temperature being carefully maintained at about 35° C. The size of the pigment particles in the aqueous solution is no greater than about 1 µm. The resultant particles are insoluble in the liquid composition but are soluble in the wash solution during automatic dishwashing. The resultant colored particles are also non-staining to plastic surfaces.

Accordingly, having thus described the invention in detail, it will be obvious to those skilled in the art that various changes may be made without departing from the scope of the invention and the invention is not to be considered limited to what is described in the specification.

What is claimed is:

1. A process for forming a non-staining colored composite particle suitable for incorporation in a bleach-containing liquid detergent composition, comprising the steps of:

a) forming a colored liquid dispersion of pigment particles in a first liquid medium, wherein the size of said pigment particles in said colored liquid dispersion is no greater than about 5 µm;

b) mixing said colored liquid dispersion with a polymeric material and a second liquid medium to form a sprayable colored polymeric material, said polymeric material being selected from the group consisting of alkyl cellulose ethers and polyvinyl alcohol; and c) spraying said colored polymeric material on a composite particle, and forming a colored polymeric coating on said composite particle.

2. The process according to claim 1, wherein the size of said pigment particles in said colored liquid dispersion is no greater than about 1 µm.

3. The process according to claim 2, wherein the size of said pigment particles in said colored liquid dispersion is no greater than about 0.1 µm.

4. The process according to claim 3, wherein the size of said pigment particles in said colored liquid dispersion is no greater than about 0.01 µm.

5. The process according to claim 1, wherein the first liquid medium is water.

6. The process according to claim 5, wherein the first liquid medium is water mixed with up to about 10% by weight of a nonionic surfactant.

7. The process according to claim 1, further including the step of maintaining the amount of surfactants used in said bleach-containing liquid detergent composition at a preselected value such that when the bleach-containing liquid detergent composition is diluted in a wash solution, the amount of surfactant delivered in the wash solution is less than critical micell concentration.

8. The process according to claim 1, wherein said composite particle remains insoluble in said bleach-containing liquid detergent composition but soluble in automatic dishwashing wash solution.

9. The process according to claim 1, wherein said colored polymeric coating is soluble in an automatic dishwashing wash solution and leaves no significant residue.

10. The process according to claim 1, wherein said colored polymeric coating is formed from methyl cellulose.

11. The process according to claim 10, wherein said colored polymeric coating is formed from methyl cellulose having a molecular weight in a range of from about 5,000 to about 100,000.

12. The process according to claim 1, wherein the step of spraying said colored polymeric material on a composite particle includes the step of forming a sprayable aqueous solution of a polymeric material, said polymeric material being present in said sprayable aqueous solution in an amount in a range of from about 1% to about 20% by weight.

13. The process according to claim 12, wherein said polymeric material is present in said sprayable aqueous solution in an amount in a range of from about 3% to about 10% by weight.

14. The process according to claim 12, wherein the temperature of said sprayable aqueous solution is maintained within a range of from about 30° C. to about 40° C. while spraying.

* * * * *